United States Patent
Zhou et al.

(10) Patent No.: US 9,322,984 B2
(45) Date of Patent: Apr. 26, 2016

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventors: Gege Zhou, Shenzhen (CN); Guofu Tang, Shenzhen (CN); Yuchun Hsiao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 25 days.

(21) Appl. No.: 14/360,612

(22) PCT Filed: Apr. 22, 2014

(86) PCT No.: PCT/CN2014/075994
§ 371 (c)(1),
(2) Date: May 23, 2014

(87) PCT Pub. No.: WO2015/135240
PCT Pub. Date: Sep. 17, 2015

(65) Prior Publication Data
US 2015/0253494 A1  Sep. 10, 2015

(30) Foreign Application Priority Data
Mar. 10, 2014 (CN) .......................... 2014 1 0086584

(51) Int. Cl.
*G02F 1/1335* (2006.01)
*F21V 8/00* (2006.01)
*G02F 1/1333* (2006.01)

(52) U.S. Cl.
CPC ........ *G02B 6/0088* (2013.01); *G02F 1/133308* (2013.01); *G02B 6/0093* (2013.01); *G02F 2001/133314* (2013.01)

(58) Field of Classification Search
CPC ................ G02B 6/0088; G02B 6/0093; G02F 1/133308; G02F 2001/133314
USPC ....................................................... 349/58–68
See application file for complete search history.

(56) References Cited

U.S. PATENT DOCUMENTS

| 2003/0164913 | A1* | 9/2003 | Ogawa | G02B 6/0088 349/113 |
| 2009/0290092 | A1* | 11/2009 | Tang | G02B 6/0088 349/61 |

FOREIGN PATENT DOCUMENTS

| CN | 101587262 A | 11/2009 |
| CN | 102494273 A | 6/2012 |
| CN | 102998842 A | 3/2013 |
| KR | 101246237 B1 | 3/2013 |

* cited by examiner

*Primary Examiner* — Charles Chang
(74) *Attorney, Agent, or Firm* — Andrew C. Cheng

(57) ABSTRACT

The present invention provides a backlight module and a liquid crystal display device using the backlight module. The backlight module includes a backplane (2), a light guide plate (4) arranged in the backplane, a backlight source (6) arranged in the backplane, and a plurality of mounting member (8) in the backplane to position and fix the light guide plate (4). The light guide plate (4) includes a main body (42) and a plurality of mounting sections (44) extending outwards from sides of the main body. Each of the mounting sections (44) includes a first lug (442) and a second lug (444) that are spaced from each other. The mounting members (8) each include a base (82) and first, second, and third positioning pillars (84, 86, 88) extending upwards from the base (82) and arranged sequentially to space from each other. The main body (42) is positioned against the base (82) and the second positioning pillar (86). The first lug (442) is positioned against the base (82) and the first positioning pillar (84). The second lug (444) is positioned against the base (82) and the third positioning pillar (88).

14 Claims, 6 Drawing Sheets

BACKLIGHT MODULE AND LIQUID CRYSTAL DISPLAY DEVICE USING SAME

BACKGROUND OF THE INVENTION

1. Field of the Invention

The present invention relates to the field of flat panel displaying, and in particular to a backlight module and a liquid crystal display device using the backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Referring to FIG. 1, a cross-sectional view is given to show a conventional side-edge backlight module, which comprises: a backplane 100, a light guide plate 300 arranged in the backplane 100, and a backlight source 500 arranged inside the backplane 100 and located beside the light guide plate 300. The backlight source 500 emits light that is converted by the light guide plate 300 into a planar light source supplied to a liquid crystal display panel.

Since the liquid guide plate provides the function of converting a linear light source into a planar light source, the positioning of the light guide plate is of vital importance. Heretofore, the light guide plate is fixed in a backplane by screws. When the light guide plate undergoes expansion resulting from heating or contraction resulting from cooling or is subjected to impacts resulting from external forces, fixing through screws may not provide good cushioning to the expansion or stresses so that the light guide plate may be damaged and the quality of the backlight module affected.

SUMMARY OF THE INVENTION

An object of the present invention is to provide a backlight module that has a simple structure, effectively cushions expansion/contraction of a light guide plate, enhances the quality of the backlight module, and extends the life span of the backlight module.

Another object of the present invention is to provide a liquid crystal display device that comprises a backlight module that has a simple structure and effectively cushions expansion/contraction of a light guide plate so as to enhance the quality of the liquid crystal display device and extend the life span of the liquid crystal display device.

To achieve the above object, the present invention provides a backlight module, which comprises: a backplane, a light guide plate arranged in the backplane, a backlight source arranged in the backplane, and a plurality of mounting members arranged in the backplane to position and fix the light guide plate. The light guide plate comprises a main body and a plurality of mounting sections extending outwards from sides of the main body. Each of the mounting sections comprises a first lug and a second lug that are spaced from each other. The mounting members each comprise a base and first, second, and third positioning pillars extending upwards from the base and arranged sequentially to space from each other. The first and second positioning pillars define therebetween a first resilient opening. The second and third positioning pillars define therebetween a second resilient opening. The main body is positioned against the base and the second positioning pillar. The first lug is positioned against the base and a side of the first positioning lug that is distant from the second positioning pillar. The second lug is positioned against the base and a side of the third positioning lug that is distant from the second positioning pillar.

Four mounting sections are provided respectively on two opposite side surfaces of the main body and four mounting members are provided for respectively mating the four mounting sections.

The mounting members are each integrally formed of an elastic material and the light guide plate is integrally formed.

The elastic material comprises an elastic plastic material.

The backlight module further comprises a bottom reflector plate arranged between the backplane and the light guide plate and an optical film assembly arranged above the light guide plate.

The present invention also provides a liquid crystal display device, which comprises: a backlight module, a mold frame mounted on the backlight module, a liquid crystal display panel arranged on the mold frame, and a front bezel arranged on the liquid crystal display panel. The back module comprises a backplane, a light guide plate arranged in the backplane, a backlight source arranged in the backplane, and mounting members arranged in the backplane to position and fix the light guide plate. The light guide plate comprises a main body and a plurality of mounting sections extending outwards from sides of the main body. Each of the mounting sections comprises a first lug and a second lug that are spaced from each other. The mounting members each comprise a base and first, second, and third positioning pillars extending upwards from the base and arranged sequentially to space from each other. The first and second positioning pillars define therebetween a first resilient opening. The second and third positioning pillars define therebetween a second resilient opening. The main body is positioned against the base and the second positioning pillar. The first lug is positioned against the base and a side of the first positioning lug that is distant from the second positioning pillar. The second lug is positioned against the base and a side of the third positioning lug that is distant from the second positioning pillar.

Four mounting sections are provided respectively on two opposite side surfaces of the main body and four mounting members are provided for respectively mating the four mounting sections.

The mounting members are each integrally formed of an elastic material and the light guide plate is integrally formed.

The elastic material comprises an elastic plastic material.

The liquid crystal display device further comprises a bottom reflector plate arranged between the backplane and the light guide plate and an optical film assembly arranged above the light guide plate.

The present invention further provides a liquid crystal display device, which comprises: a backlight module, a mold frame mounted on the backlight module, a liquid crystal display panel arranged on the mold frame, and a front bezel arranged on the liquid crystal display panel, the back module comprising a backplane, a light guide plate arranged in the backplane, a backlight source arranged in the backplane, and mounting members arranged in the backplane to position and fix the light guide plate, the light guide plate comprising a main body and a plurality of mounting sections extending outwards from sides of the main body, each of the mounting sections comprising a first lug and a second lug that are spaced from each other, the mounting members each comprising a base and first, second, and third positioning pillars extending upwards from the base, the first and second positioning pillars defining therebetween a first resilient opening, the second and third positioning pillars defining therebetween a second resilient opening, the main body being positioned against the base and the second positioning pillar, the first lug being positioned against the base and a side of the first positioning lug that is distant from the second positioning pillar, the second lug being positioned against the base and a side of the third positioning lug that is distant from the second positioning pillar;

wherein four mounting sections are provided respectively on two opposite side surfaces of the main body and four mounting members are provided for respectively mating the four mounting sections.

The mounting members are each integrally formed of an elastic material and the light guide plate is integrally formed.

The elastic material comprises an elastic plastic material.

The liquid crystal display device further comprises a bottom reflector plate arranged between the backplane and the light guide plate and an optical film assembly arranged above the light guide plate.

The efficacy of the present invention is that the present invention provides a backlight module and a liquid crystal display device using the backlight module. Mounting members are arranged at sides of the light guide plate to effectively position and fix the light guide plate. Further, the mounting members are configured as a structure comprising three positioning pillars having resilient openings formed therein so that in assembling, two sides of each mounting section of the light guide plate are set in engagement with sides of two positioning pillars, whereby when the light guide plate is heated and expands, the mounting sections compress the two side positioning pillars toward the central positioning pillar to cushion shifting of the light guide plate; when the light guide plate contracts, the two side positioning pillars undergo elastic deformation for restoration to ensure the effect of positioning and fixing of the light guide plate so as to effectively enhance the quality of the backlight module and the liquid crystal display device using the backlight module to extend the life spans thereof.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
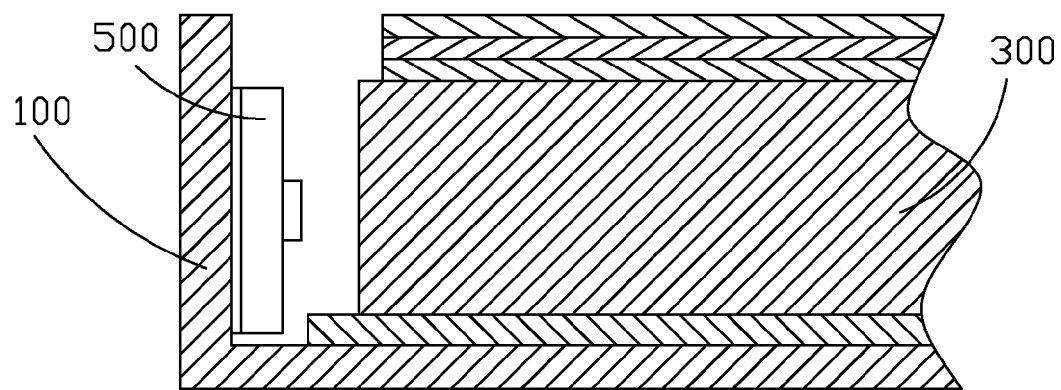
FIG. 1 is a cross-sectional view showing a conventional side-edge backlight module.
Figure 2:
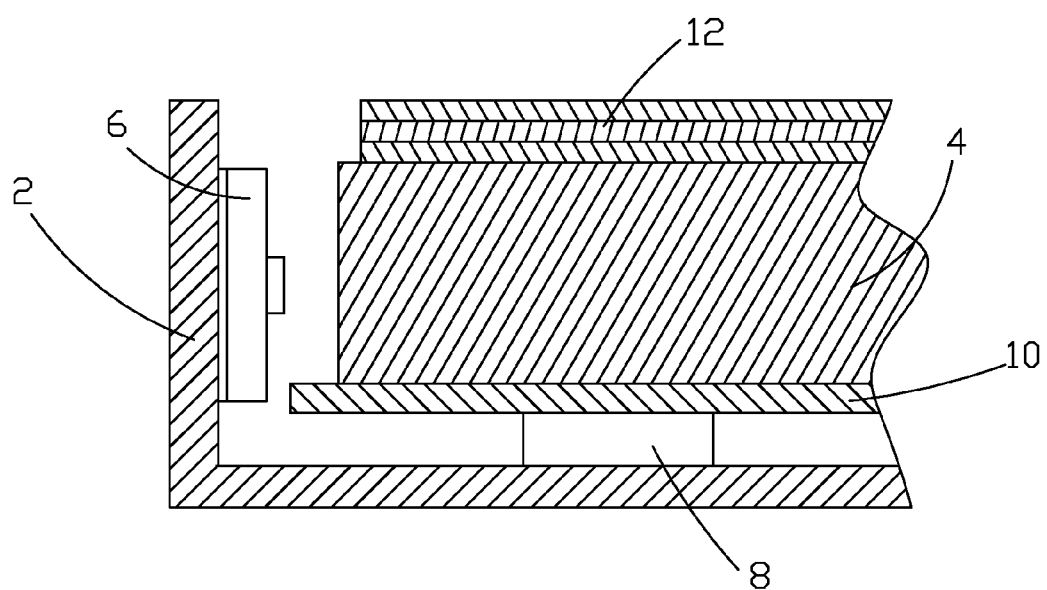
FIG. 2 is a cross-sectional view showing a backlight module according to the present invention.

Referring to FIG. 2, the present invention provides a backlight module, which comprises: a backplane 2, a light guide plate 4 arranged in the backplane 2, a backlight source 6 arranged in the backplane 2, mounting members 8 arranged in the backplane 2 to position and fix the light guide plate 4, a bottom reflector plate 10 arranged between the light guide plate 4 and the backplane 2, and an optical film assembly 12 arranged above the light guide plate 4. The mounting member 8 functions to position and fix the light guide plate 4 in the backplane 2. The backlight source 6 gives off light that directly enters or is reflected by the bottom reflector plate 10 to enter the light guide plate 4 and is converted by the light guide plate 4 into a planar light source.

Figure 3:
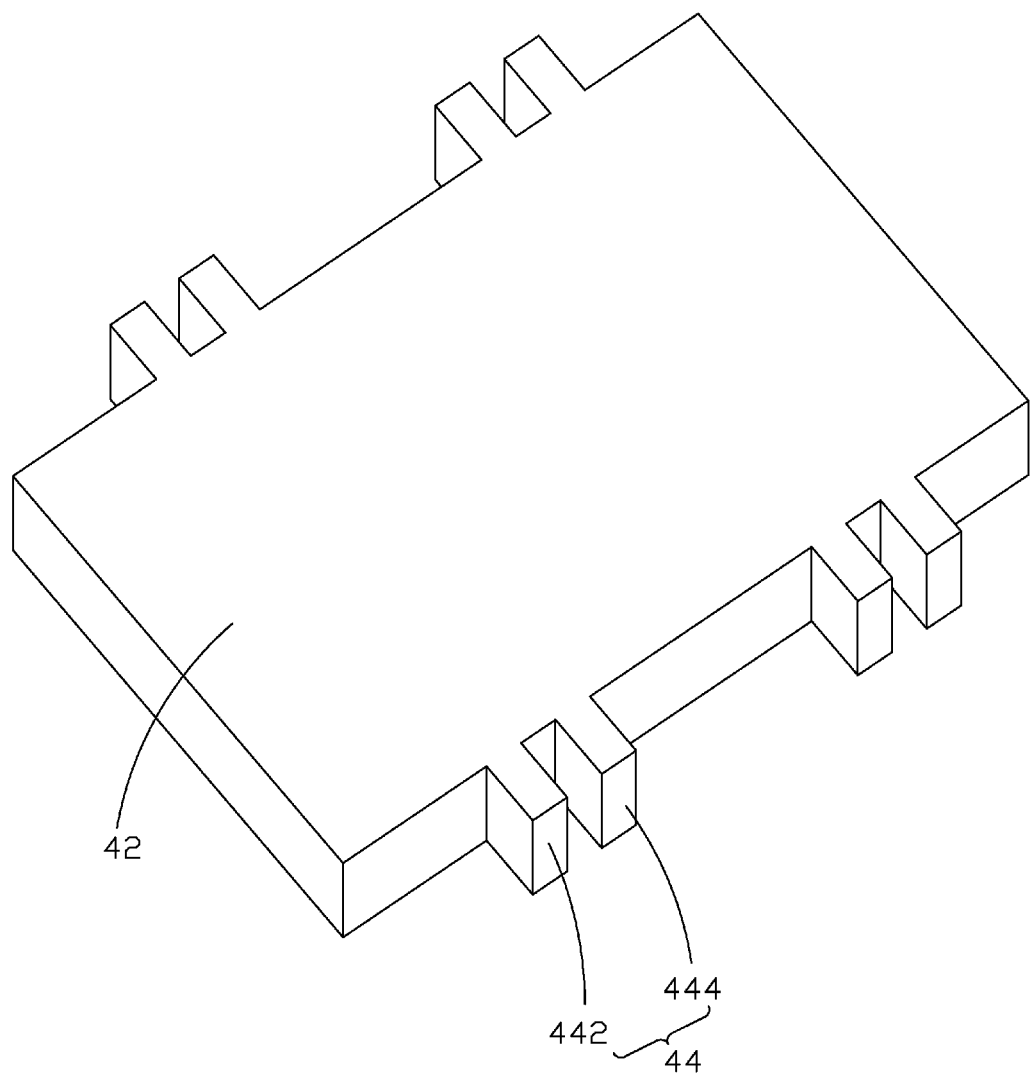
FIG. 3 is a perspective view showing a light guide plate of the backlight module according to the present invention.

Referring to FIG. 3, in the instant embodiment, the light guide plate 4 comprises a main body 42 and a plurality of mounting sections 44 extending outwards from sides of the main body 42. The light guide plate 4 is integrally formed. Each of the mounting sections 44 comprises a first lug 442 and a second lug 444 that are spaced from each other. At least two mounting sections 44 are provided and are respectively formed on two opposite side surfaces of the main body 42. Preferably, in the instant embodiment, four mounting sections 44 are provided and are respectively formed on two opposite side surfaces of the main body 42. Correspondingly, four mounting members 8 are provided to respectively mate the four mounting sections 44.

Figure 4:
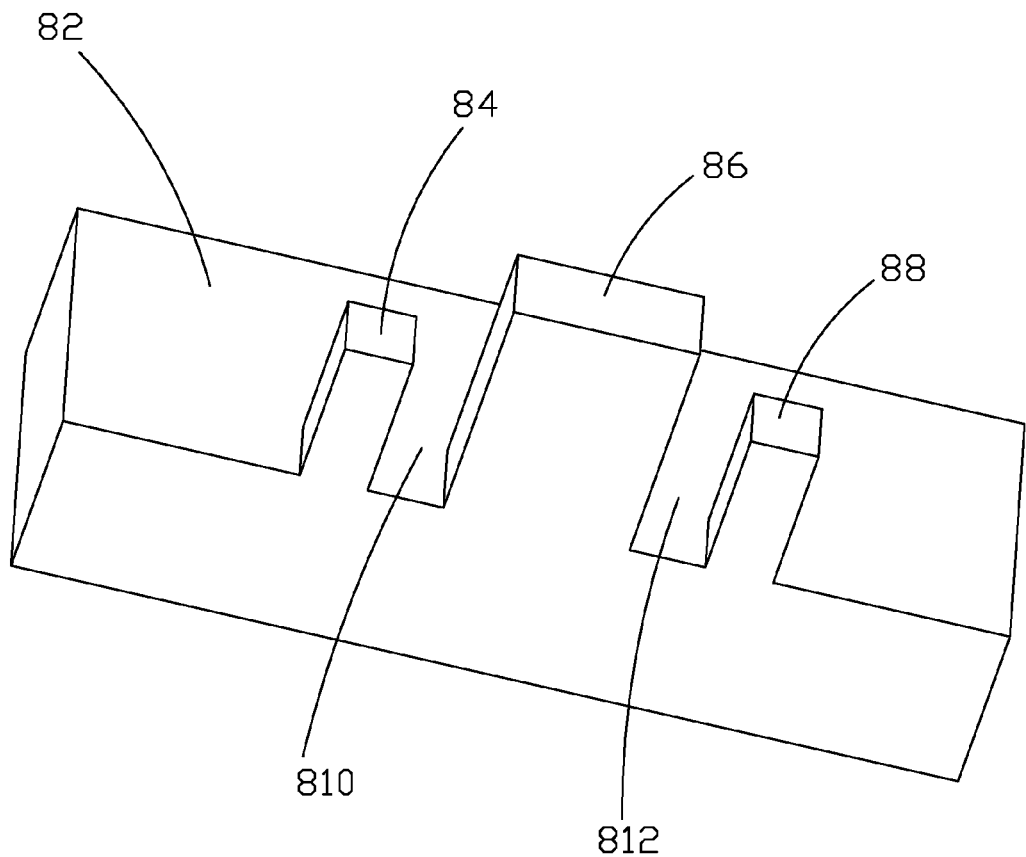
FIG. 4 is a perspective view showing a mounting member of the backlight module according to the present invention.

Referring to FIG. 4, the mounting member 8 is integrally formed of an elastic material. Preferably, in the instant embodiment, the elastic material comprises an elastic plastic material. The mounting member 8 comprises a base 82 and first, second, and third positioning pillars 84, 86, 88 extending upwards from the base 82 and arranged sequentially to space from each other. The first, second, and third positioning pillars 84, 86, 88 are arranged in sequence and spaced from each other, whereby a first resilient opening 810 is formed between the first and second positioning pillars 84, 86 and a second resilient opening 812 is formed between the second and third positioning pillars 86, 88.

The mounting members 8 are mounted to a bottom plate of the backplane 2 or are alternatively mounted to a mold frame (not shown). When the mounting members 8 are mounted to the bottom plate of the backplane 2, fixing can be achieved with bonding or screwing. Under such a condition, the main body 42 of the light guide plate 4 has a bottom surface positioned on and supported by the base 82 and a side surface positioned against the second positioning pillar 86. The first lug 442 and the second lug 444 have bottom surfaces positioned on and supported by the base 82 and side surfaces respectively positioned against sides of the first and third positioning pillar 84, 88 that are distant from the second positioning pillar 86. When the mounting members 8 are mounted to the mold frame, they can be integrally formed with the mold frame and under this condition, the light guide plate 4 has a top surface positioned against the base 82 and a side surface positioned against the second positioning pillar 86; the first lug 442 and the second lug 444 have top surfaces positioned against the base 82 and side surfaces respectively positioned against sides of the first and third positioning pillars 84, 88 that are distant from the second positioning pillar 86.

Figure 5:
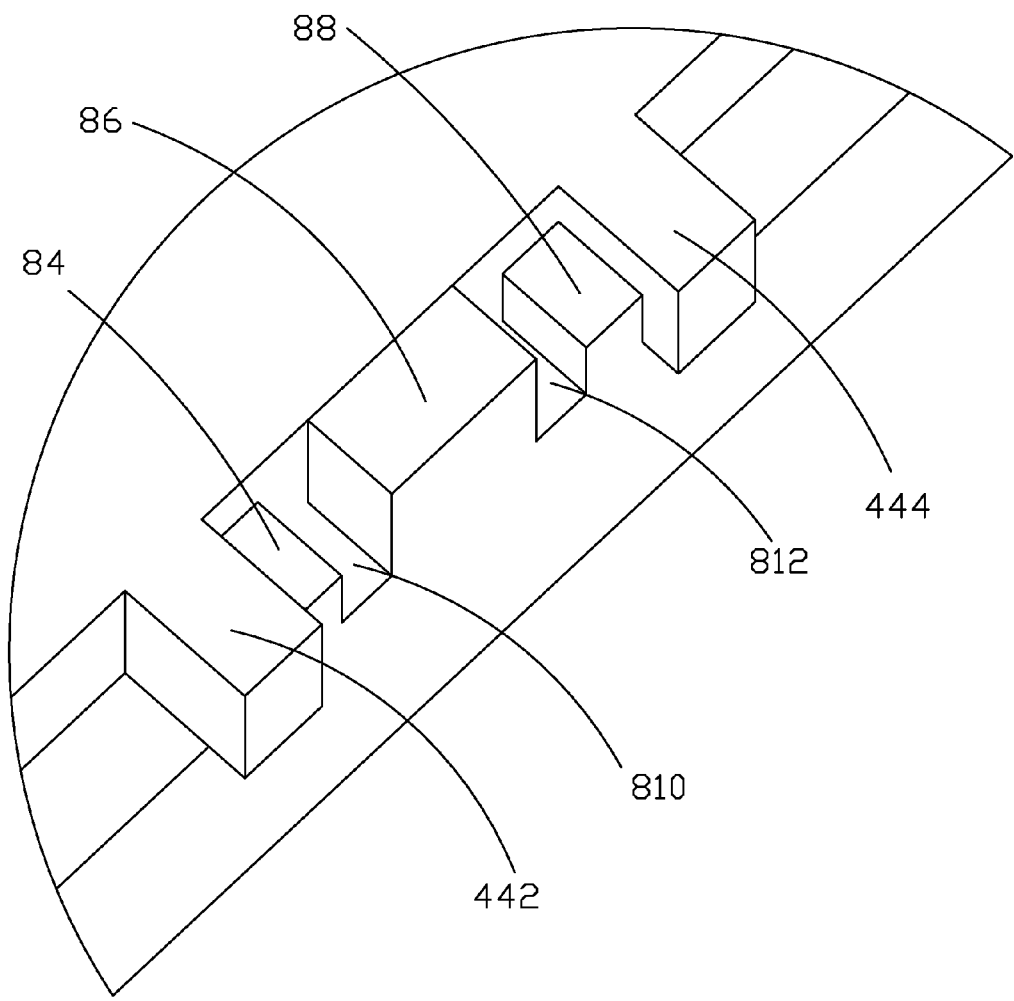
FIG. 5 is a perspective view showing the light guide plate and the mounting member of the backlight module of the present invention mating each other.

Referring to FIG. 5, to assemble, the main body 42 of the light guide plate 4 is positioned on the base 82 of the mounting member 8 and is also in abutting engagement with the second positioning pillar 86 and the first lug 442 and the second lug 444 are positioned on the base 82 and are respectively in engagement with outer sides of the first and third positioning pillars 84, 88. Due to the first resilient opening 810 and the second resilient opening 812, when the light guide plate 4 undergoes thermal expansion, the first lug 442 and the second lug 444 respectively compress the first and third positioning pillars 84, 88, making the first and third positioning pillars 84, 88 move toward the second positioning pillar 86, thereby cushioning the expansion amount of the light guide plate 4 and reducing internal stress. When the light guide plate 4 is cooled and thus contracts, the first and third positioning pillars 84, 88 undergo elastic deformation for restoration and are kept in engagement with the first lug 442 and the second lug 444 so as to maintain positioning and fixing the light guide plate 4, thereby ensuring the effect of positioning and fixing of the light guide plate 4 and also effectively cushioning expansion/contraction of the light guide plate 4 and reducing internal stress to prevent the light guide plate 4 from breaking during the use and transportation and effectively ensure the quality of the backlight module.

Figure 6:
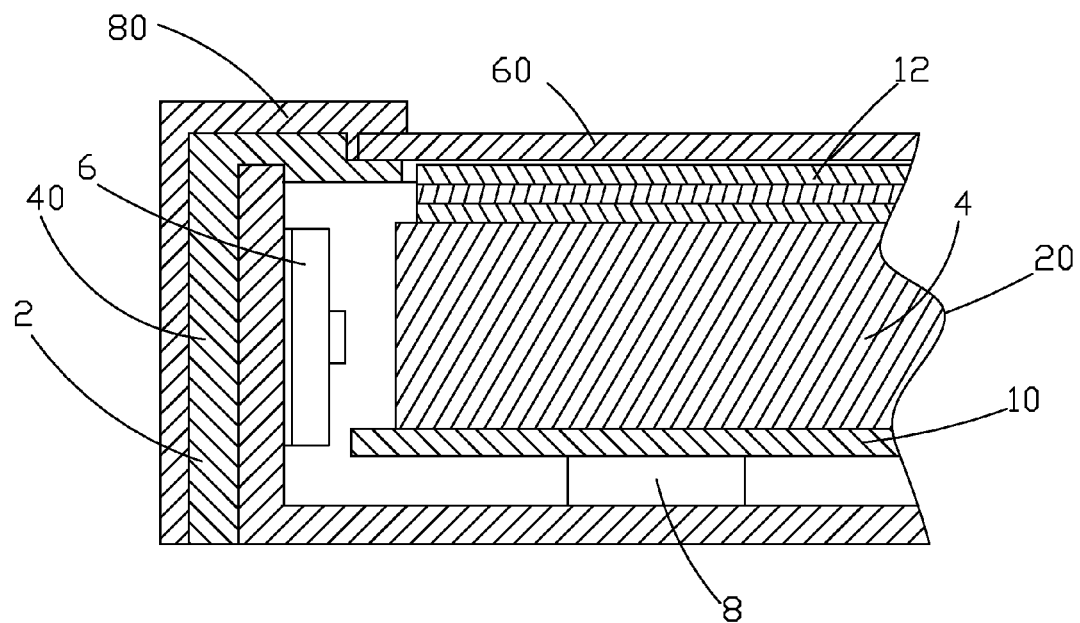
FIG. 6 is a cross-sectional view showing a liquid crystal display device according to the present invention.

Referring to FIG. 6, the present invention also provides a liquid crystal display device, which comprises: a backlight module 20, a mold frame 40 mounted on the backlight module 20, a liquid crystal display panel 60 arranged on the mold frame 40, and a front bezel 80 arranged on the liquid crystal display panel 60. The back module 20 comprises a backplane 2, a light guide plate 4 arranged in the backplane 2, a backlight source 6 arranged in the backplane 2, a mounting member 8 arranged in the backplane 2 to position and fix the light guide plate 4, a bottom reflector plate 10 arranged between the light guide plate 4 and the backplane 2, and an optical film assembly 12 arranged above the light guide plate 4. The mounting member 8 functions to position and fix the light guide plate 4 in the backplane 2. The backlight source 6 gives off light that directly enters or is reflected by the bottom reflector plate 10 to enter the light guide plate 4 and is converted by the light guide plate 4 into a planar light source. The mold frame 40 functions to carry the liquid crystal display panel 60. The liquid crystal display panel 60 displays images. The front bezel 80 fixes the liquid crystal display panel 60 in the mold frame 40.

The detailed description of the backlight module given previously with reference to FIGS. 2-5 is detailed description for the backlight module 20 and repeated description will be omitted.

In summary, the present invention provides a backlight module and a liquid crystal display device using the backlight module. Mounting members are arranged at sides of the light guide plate to effectively position and fix the light guide plate. Further, the mounting members are configured as a structure comprising three positioning pillars having resilient openings formed therein so that in assembling, two sides of each mounting section of the light guide plate are set in engagement with sides of two positioning pillars, whereby when the light guide plate is heated and expands, the mounting sections compress the two side positioning pillars toward the central positioning pillar to cushion shifting of the light guide plate; when the light guide plate contracts, the two side positioning pillars undergo elastic deformation for restoration to ensure the effect of positioning and fixing of the light guide plate so as to effectively enhance the quality of the backlight module and the liquid crystal display device using the backlight module to extend the life spans thereof.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane, a backlight source arranged in the backplane, and a plurality of mounting members arranged in the backplane to position and fix the light guide plate, the light guide plate comprising a main body and a plurality of mounting sections extending outwards from sides of the main body, each of the mounting sections comprising a first lug and a second lug that are spaced from each other, the mounting members each comprising a base and first, second, and third positioning pillars extending upwards from the base and arranged sequentially to space from each other in such a way that the first and third pillars each have an inner side surface and an outer side surface opposite to each other and the inner side surfaces of the first and third pillars respectively face and are spaced from two opposite side surfaces of the second pillar so that the first and second positioning pillars therebetween a first resilient opening that is delimited between the inner side surface of the first pillar and the corresponding side surface of the second pillar and the second and third positioning pillars define therebetween a second resilient opening that is delimited between the inner side surface of the third pillar and the corresponding side surface of the second pillar, the first and second pillars being separated from each other by the first resilient opening, the second and third pillars being separated from each other by the second resilient opening, the main body being positioned against the base and the second positioning pillar, the first lug being positioned against the base and the outer side surface of the first positioning lug that is distant from the second positioning pillar, the second lug being positioned against the base and the outer side surface of the third positioning lug that is distant from the second positioning pillar.

2. The backlight module as claimed in claim 1, wherein four mounting sections are provided respectively on two opposite side surfaces of the main body and four mounting members are provided for respectively mating the four mounting sections.

3. The backlight module as claimed in claim 1, wherein the mounting members are each integrally formed of an elastic material and the light guide plate is integrally formed.

4. The backlight module as claimed in claim 3, wherein the elastic material comprises an elastic plastic material.

5. The backlight module as claimed in claim 1 further comprising a bottom reflector plate arranged between the backplane and the light guide plate and an optical film assembly arranged above the light guide plate.

6. A liquid crystal display device, comprising: a backlight module, a mold frame mounted on the backlight module, a liquid crystal display panel arranged on the mold frame, and a front bezel arranged on the liquid crystal display panel, the back module comprising a backplane, a light guide plate arranged in the backplane, a backlight source arranged in the backplane, and mounting members arranged in the backplane to position and fix the light guide plate, the light guide plate comprising a main body and a plurality of mounting sections extending outwards from sides of the main body, each of the mounting sections comprising a first lug and a second lug that are spaced from each other, the mounting members each comprising a base and first, second, and third positioning pillars extending upwards from the base and arranged sequentially to space from each other in such a way that the first and third pillars each have an inner side surface and an outer side surface opposite to each other and the inner side surfaces of the first and third pillars respectively face and are spaced from two opposite side surfaces of the second pillar so that the first and second positioning pillars therebetween a first resilient opening that is delimited between the inner side surface of the first pillar and the corresponding side surface of the second pillar and the second and third positioning pillars define therebetween a second resilient opening that is delimited between the inner side surface of the third pillar and the corresponding side surface of the second pillar, the first and second pillars being separated from each other by the first resilient opening, the second and third pillars being separated from each other by the second resilient opening, the main body being positioned against the base and the second positioning pillar, the first lug being positioned against the base and the outer side surface of the first positioning lug that is distant from the second positioning pillar, the second lug being positioned against the base and the outer side surface of the third positioning lug that is distant from the second positioning pillar.

7. The liquid crystal display device as claimed in claim 6, wherein four mounting sections are provided respectively on two opposite side surfaces of the main body and four mounting members are provided for respectively mating the four mounting sections.

8. The liquid crystal display device as claimed in claim 6, wherein the mounting members are each integrally formed of an elastic material and the light guide plate is integrally formed.

9. The liquid crystal display device as claimed in claim 8, wherein the elastic material comprises an elastic plastic material.

10. The liquid crystal display device as claimed in claim 6 further comprising a bottom reflector plate arranged between the backplane and the light guide plate and an optical film assembly arranged above the light guide plate.

11. A liquid crystal display device, comprising: a backlight module, a mold frame mounted on the backlight module, a liquid crystal display panel arranged on the mold frame, and a front bezel arranged on the liquid crystal display panel, the back module comprising a backplane, a light guide plate arranged in the backplane, a backlight source arranged in the backplane, and mounting members arranged in the backplane to position and fix the light guide plate, the light guide plate comprising a main body and a plurality of mounting sections extending outwards from sides of the main body, each of the mounting sections comprising a first lug and a second lug that are spaced from each other, the mounting members each comprising a base and first, second, and third positioning pillars extending upwards from the base and arranged sequentially to space from each other in such a way that the first and third pillars each have an inner side surface and an outer side surface opposite to each other and the inner side surfaces of the first and third pillars respectively face and are spaced from two opposite side surfaces of the second pillar so that the first and second positioning pillars therebetween a first resilient opening that is delimited between the inner side surface of the first pillar and the corresponding side surface of the second pillar and the second and third positioning pillars define therebetween a second resilient opening that is delimited between the inner side surface of the third pillar and the corresponding side surface of the second pillar, the first and second pillars being separated from each other by the first resilient opening, the second and third pillars being separated from each other by the second resilient opening, the main body being positioned against the base and the second positioning pillar, the first lug being positioned against the base and the outer side surface of the first positioning lug that is distant from the second positioning pillar, the second lug being positioned against the base and the outer side surface of the third positioning lug that is distant from the second positioning pillar;

wherein four mounting sections are provided respectively on two opposite side surfaces of the main body and four mounting members are provided for respectively mating the four mounting section.

12. The liquid crystal display device as claimed in claim 11, wherein the mounting members are each integrally formed of an elastic material and the light guide plate is integrally formed.

13. The liquid crystal display device as claimed in claim 12, wherein the elastic material comprises an elastic plastic material.

14. The liquid crystal display device as claimed in claim 11 further comprising a bottom reflector plate arranged between the backplane and the light guide plate and an optical film assembly arranged above the light guide plate.

\* \* \* \* \*